US012768631B2

(12) United States Patent
Jernigan

(10) Patent No.: US 12,768,631 B2
(45) Date of Patent: Oct. 20, 2026

(54) REINFORCED ROLL-OVER RESISTANT MEASURING TAPE

(71) Applicant: Apex Brands, Inc., Apex, NC (US)

(72) Inventor: Riley Owen Jernigan, Charlotte, NC (US)

(73) Assignee: Apex Brands, Inc., Apex, NC (US)

( * ) Notice: Subject to any disclaimer, the term of this patent is extended or adjusted under 35 U.S.C. 154(b) by 318 days.

(21) Appl. No.: 18/683,616

(22) PCT Filed: Aug. 25, 2022

(86) PCT No.: PCT/US2022/041517

§ 371 (c)(1),
(2) Date: Feb. 14, 2024

(87) PCT Pub. No.: WO2023/028225

PCT Pub. Date: Mar. 2, 2023

(65) Prior Publication Data

US 2025/0137769 A1 May 1, 2025

Related U.S. Application Data

(60) Provisional application No. 63/237,594, filed on Aug. 27, 2021.

(51) Int. Cl.
*G01B 3/1003* (2020.01)
*G01B 3/1056* (2020.01)

(52) U.S. Cl.
CPC ......... *G01B 3/1003* (2020.01); *G01B 3/1056* (2013.01)

(58) Field of Classification Search
CPC ............................ G01B 3/1003; G01B 3/1056
See application file for complete search history.

(56) References Cited

U.S. PATENT DOCUMENTS

| | | | |
|---|---|---|---|
| 1,023,863 | A | 4/1912 | Melville |
| 2,156,905 | A | 5/1939 | Stowell |
| 2,319,724 | A | 5/1943 | Julius |

(Continued)

FOREIGN PATENT DOCUMENTS

| | | |
|---|---|---|
| DE | 3129843 A1 | 2/1983 |

OTHER PUBLICATIONS

International Search Report and Written Opinion from corresponding International Application No. PCT/US2022/041517 mailed Jan. 11, 2023, all pages cited in its entirety.

*Primary Examiner* — Yaritza Guadalupe-McCall
(74) *Attorney, Agent, or Firm* — Burr & Forman

(57) ABSTRACT

A blade for a measuring tape device may include a first end at which an end hook is configurable, a second end configured to be operably coupled to a reel assembly of the measuring tape device, a metallic strip of material extending between the first end and second end where the metallic strip is cupped to define a first concave face, a reinforcement strip cupped to define a second concave face, and a lateral retention assembly. The reinforcement strip may be applied to a longitudinal centerline of a selected portion of the metallic strip such that the first concave face is directed toward the second concave face. The lateral retention assembly may be operably coupled to the metallic strip to retain the reinforcement strip laterally while enabling the reinforcement strip to move relative to the metallic strip in a longitudinal direction.

18 Claims, 9 Drawing Sheets

(56) References Cited

U.S. PATENT DOCUMENTS

| | | | | |
|---|---|---|---|---|
| 4,275,503 | A | 6/1981 | Bergkvist | |
| 4,429,462 | A * | 2/1984 | Rutty | G01B 3/1003 242/405 |
| 7,062,862 | B2 * | 6/2006 | Wheaton | G01B 3/1003 33/771 |
| 7,444,759 | B1 | 11/2008 | Fleming et al. | |
| 7,490,414 | B2 * | 2/2009 | Critelli | G01B 1/00 33/771 |
| 7,730,630 | B1 | 6/2010 | Lamb et al. | |
| 9,352,528 | B1 | 5/2016 | Brooks | |
| 10,989,512 | B2 * | 4/2021 | McKenzie | G01B 3/1056 |
| 11,236,983 | B2 * | 2/2022 | Patrangenaru | G01B 3/1003 |
| 11,480,418 | B2 * | 10/2022 | McKenzie | G01B 3/1003 |
| 11,761,745 | B2 * | 9/2023 | Higgins | G01B 3/1007 33/769 |
| 2003/0154617 | A1 | 8/2003 | Ricalde | |
| 2010/0293801 | A1 | 11/2010 | Lamb | |
| 2012/0036727 | A1 | 2/2012 | McCarthy | |
| 2024/0077293 | A1 * | 3/2024 | Jernigan | G01B 3/1003 |
| 2024/0077294 | A1 * | 3/2024 | Struble, III | G01B 3/1003 |
| 2025/0137769 | A1 * | 5/2025 | Jernigan | G01B 3/1003 |

* cited by examiner

| | End Hook | No End Hook |
|---|---|---|
| Test sample #1 | 24.95 | 41.4 |
| Test sample #2 | 29.4 | 40.6 |
| Test sample #3 | 28 | 37.4 |
| Test sample #4 | 33.8 | 39.6 |
| Test sample #5 | 28 | 36.4 |
| Test sample #6 | N/A | 38 |
| Test sample #7 | 32.95 | 43.9 |

FIG. 8.

REINFORCED ROLL-OVER RESISTANT MEASURING TAPE

TECHNICAL FIELD

Example embodiments generally relate to measuring tape devices, and particularly relate to a measuring tape that has a blade designed to reduce the incidence of roll-over responsive to blade extension.

BACKGROUND

Measuring tapes have been around for a very long time, and are common measuring tools used in numerous contexts to obtain linear measurements. Measuring tapes can come in many forms and may be made of cloth, fiber glass, metal, plastic, or the like. The materials used are often dictated by the specific measuring application. For example, tailors and dressmakers typically use a flexible tape that can be easily manipulated between two hands to measure a distance therebetween. However, for construction or carpentry applications, a stiff and often metallic tape is preferred to allow the measuring tape to be extended between a first location at which one end of the tape is anchored, and the location of the user at whose location the measuring tape is paid out from a reel assembly. The reel assembly may have a manual retracting mechanism or a self-retracting mechanism, typically depending upon the length of the measuring tape. For measuring tapes having length in a range of about 12 ft to 50 ft, self-retracting mechanisms and using metallic tape ribbons for the tape (or blade) are very common.

For nearly a century, metallic tape ribbons with a curved (or cupped) and relatively stiff construction have been preferred for use in self-retracting measuring tapes. The metallic tape ribbon tends to be flexible enough to permit the metallic tape ribbon to be wound onto a spring loaded reel assembly, but stiff enough to have a relatively long standout. The cupping of the metallic tape ribbon further enhances the standout without negatively impacting the ability of the metallic tape ribbon to be wound onto the reel assembly. By employing the end hook at one end of the tape, the user may take advantage of the standout to pay out the measuring tape toward an anchor point on a medium that is to be measured and then conduct the measurement without having to physically move to the anchor point to affix the end hook and then move away to make the measurement. Given the time and energy that can be saved by this method of measurement, taking advantage of the standout characteristics of a self-retracting measuring tape is a very popular feature. So much so, in fact, that it is not uncommon to see a user make multiple attempts to utilize standout and catch a remote end of media being measured with the end hook, rather than simply moving to the remote end of the media to manually fix the end hook to the remote end. When the standout is poor, and the user has to use multiple attempts, or fails and must resort to moving to the remote end to affix the end hook, frustration may grow, and the user may seek out a measuring tape with better standout characteristics.

Invariably, each measuring tape will have a certain length that effectively defines the maximum standout that can be achieved before the tape bends and basically collapses. The measuring tape can no longer be extended reliably toward the anchor point once this collapse occurs. However, the collapse that occurs at maximum standout is not the only type of tape bending or collapse that can occur with metallic tape ribbons. In this regard, another collapse phenomena that can occur is called rollover. Rollover occurs when the blade is rotated about the longitudinal axis of the blade. The rotation of the blade about the longitudinal axis may be desirable when measuring vertical surfaces (e.g., walls, doors, windows, etc.).

For maximum standout, the blade is extended with the apex of the convex side of the cupped shape pointing straight toward the ground. As the blade is rotated about the longitudinal axis and extended, even typical blades that are designed for long standout will tend to collapse when the angle of rotation nears 90 degrees at a relatively small amount of extension. Meanwhile, standout characteristics of some blades may enable extension of greater than 10 feet or 12 feet. Thus, it may be desirable to improve anti-rollover characteristics to decrease the gap between the maximum standout and the length at which rollover occurs.

BRIEF SUMMARY OF SOME EXAMPLES

Some example embodiments may enable the provision of a measuring tape that has improved anti-rollover characteristics.

In an example embodiment, a measuring tape device may be provided. The device may include a housing having an aperture, a reel assembly enclosed within the housing, and a blade formed from a metallic strip of material having a first end configured to extend from the housing through the aperture and a second end configured to be wound on the reel assembly. The metallic strip is cupped to define a first concave face. The blade further includes a reinforcement strip that is cupped to define a second concave face. The reinforcement strip is applied to a longitudinal centerline of a selected portion of the metallic strip such that the first concave face is directed toward the second concave face. The blade further includes a lateral retention assembly operably coupled to the metallic strip to retain the reinforcement strip laterally while enabling the reinforcement strip to move relative to the metallic strip in a longitudinal direction.

In another example embodiment, a blade for a measuring tape device may be provided. The blade may include a first end at which an end hook is configurable, a second end configured to be operably coupled to a reel assembly of the measuring tape device, a metallic strip of material extending between the first end and second end where the metallic strip is cupped to define a first concave face, a reinforcement strip cupped to define a second concave face, and a lateral retention assembly. The reinforcement strip may be applied to a longitudinal centerline of a selected portion of the metallic strip such that the first concave face is directed toward the second concave face. The lateral retention assembly may be operably coupled to the metallic strip to retain the reinforcement strip laterally while enabling the reinforcement strip to move relative to the metallic strip in a longitudinal direction.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

FIG. 8 illustrates a table showing performance data for various conventional products.

DETAILED DESCRIPTION

Figure 1:
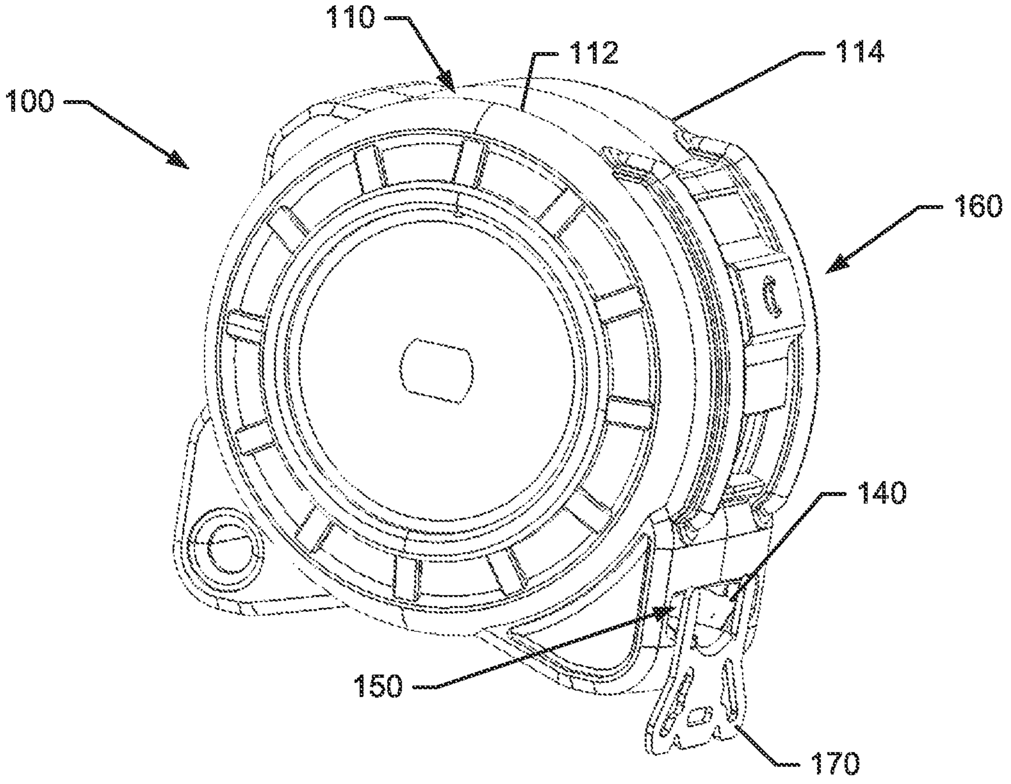
FIG. 1 illustrates a perspective view of a measuring tape device in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

As indicated above, some example embodiments may relate to the provision of a measuring tape device that may have an improved blade design for resistance to rollover. This may be accomplished by providing an anti-rollover treatment to the apex of the top of the blade, and over all or a limited length of the blade. For example, for a blade having a full length of 12 feet or less, perhaps the full length of the blade may be provided with anti-rollover treatment. However, for a blade having a full length greater than 12 feet, perhaps 12 inches to 96 inches of the blade may be provided with the anti-rollover treatment. FIG. 1 illustrates a perspective view of a measuring tape device, FIG. 2 illustrates a block diagram of such device, in accordance with an example embodiment, and FIG. 3 (which is defined by FIGS. 3A and 3B) illustrates a front view of the blade of the measuring tape device.

Figure 2:
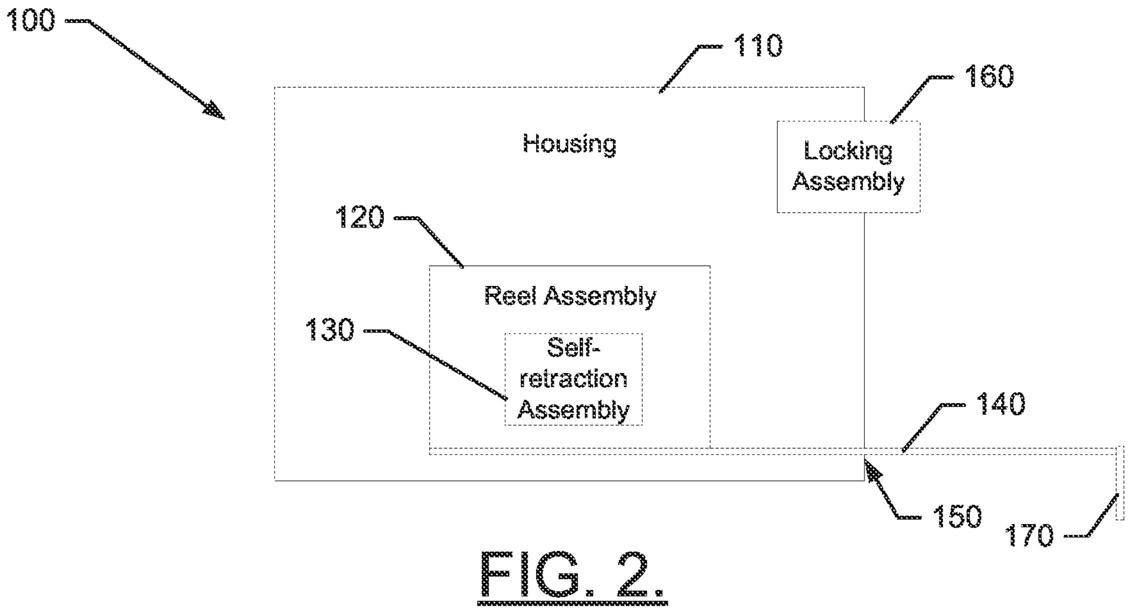
FIG. 2 illustrates a block diagram of the measuring tape device in accordance with an example embodiment.
Figure 3A:
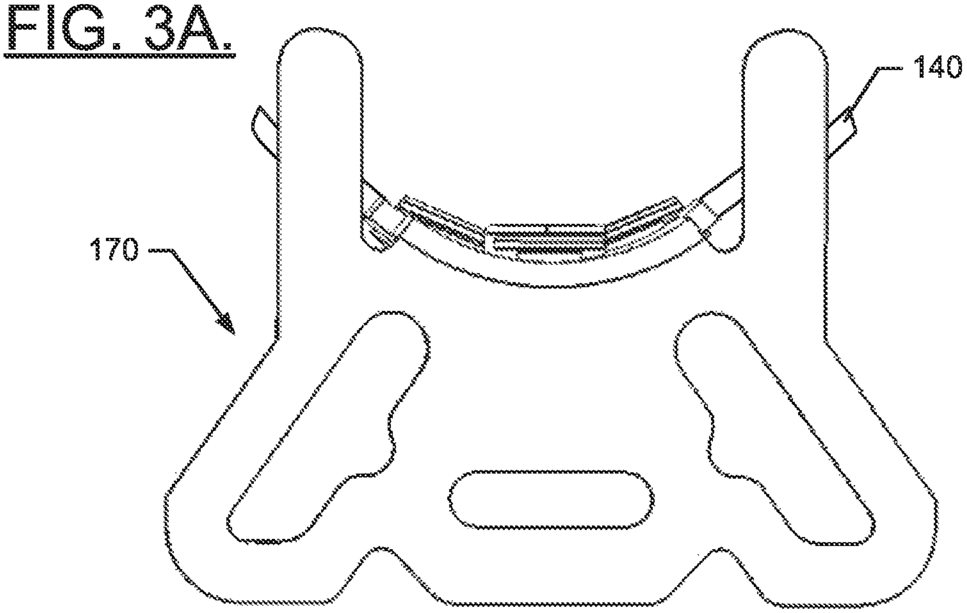
FIG. 3A illustrates a front view of the end hook in a normal orientation in accordance with an example embodiment.

Referring now to FIGS. 1-3, a measuring tape device 100 of an example embodiment may include a housing 110 that, to simplify manufacture, may include a first case half 112 and a second case half 114. The first and second case halves 112 and 114 may house a reel assembly 120 and a self-retraction assembly 130 therein. A blade 140 (or tape) portion of the device 100 may be wound onto the reel assembly 120. The blade 140 may be paid out through an aperture 150 formed in the housing 110. A locking assembly 160 may be provided to enable the reel assembly 120 to be locked to prevent the self-retraction assembly 130 from retracting the blade 140 when the locking assembly 160 is engaged.

The blade 140 has an end hook 170 disposed at one end thereof, and is affixed to the reel assembly 120 at the other end of the blade 140. The end hook 170 may be affixed (temporarily) to an anchor point on a medium that is to be measured. Once the end hook 170 is affixed to the anchor point, the blade 140 may be paid out of the aperture 150 and unwound from the reel assembly 120. When a desired length of the blade 140 has been paid out, the user can make any necessary markings, readings, etc., associated with measuring scale markings that may be printed on the blade 140. The measuring scale markings generally measure length from the end hook 170 in one or more units, with divisions and subdivisions of such units clearly marked on the blade 140.

By fixing the end hook 170 to the anchor point, the self-retraction assembly 130 (which may be spring loaded in some cases) may be prevented from retracting the paid out portions of the blade 140 into the housing 110 (via the aperture 150). Similarly, when the locking assembly 160 is engaged, a force (e.g., a pinching force) may be placed on the blade 140 to prevent retraction or motion of the reel assembly 120 may otherwise be inhibited to prevent the self-retraction assembly 130 from retracting the paid out portions of the blade 140. However, when the end hook 170 is not anchored and the locking assembly 160 is not engaged, the self-retraction assembly 130 may cause the reel assembly 120 to wind the blade 140 back onto the reel assembly 120.

As mentioned above, for a typical measuring tape, when the blade 140 is paid out through the aperture 150, the blade 140 will extend relatively straight out the aperture 150 (although some sagging or droop may be noticed due to the weight of the blade 140). The blade 140 can be extended in a guided fashion toward an intended target anchor point while the blade 140 continues to have sufficient rigidity to standout. The blade 140 will continue to extend and standout until the weight of the blade 140 extended past the aperture 150 is sufficient to cause the blade 140 to collapse and bend, thereby losing its rigidity and preventing any further guided extension. The loss of sufficient rigidity which causes collapse and bending of the blade 140 at a length of maximum standout generally occurs at a portion of the blade 140 that can be referred to as a "critical region" since it can occur at slightly different points (but generally in the same region) on different extension operations, and on different individual measuring tapes.

Figure 3B:
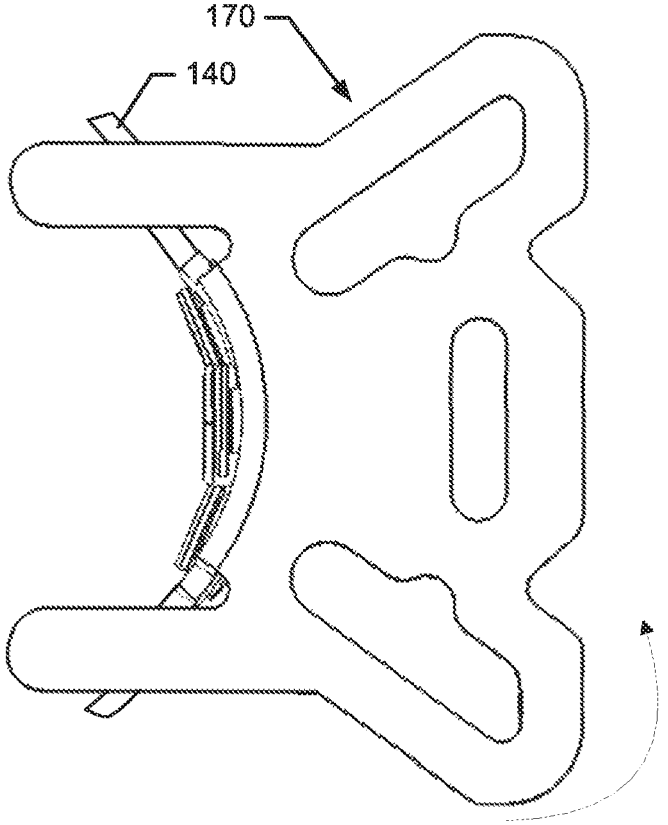
FIG. 3B illustrates the end hook rotated about ninety degrees about a longitudinal axis of the blade in accordance with an example embodiment.

It may be possible to increase the standout capabilities of the blade 140 by changing certain characteristics of the blade 140. For example, the cupping of the blade 140 such that a convex curve having an apex (or axis of symmetry) that is generally faced toward the ground when the blade 140 is extended to achieve maximum standout is well known to improve standout of the blade 140. Notably, the opposite side of the blade 140 also has a curved shape that generally faces upward in this case with an axis of symmetry (i.e., a concave apex). This is the orientation shown in FIG. 3A. However, the blade 140 is not always paid out (or held) in this orientation. To the contrary, in some cases, measurement of vertical surfaces or structures may call for paying the blade 140 out of the housing 110 at an angled orientation (e.g., rotated about the longitudinal axis of the blade 140 as much as by 90 degrees, and generally at greater than 60 degrees). FIG. 3B shows the blade 140 and end hook 170 rotated by 90 degrees so that the axis of symmetry of the convex side of the cupped blade is now rotated 90 degrees and to the viewer's right. For a typical blade that is constructed to have improved standout, a collapse or bending phenomenon referred to as rollover (which is similar to that which occurs at maximum standout in terms of the collapse or bending of the blade 140 that occurs) can occur at a corresponding critical region for rollover. The critical region for rollover for many cupped blades often tends to occur at between two and three feet of extension out of the housing 110.

Figure 4:
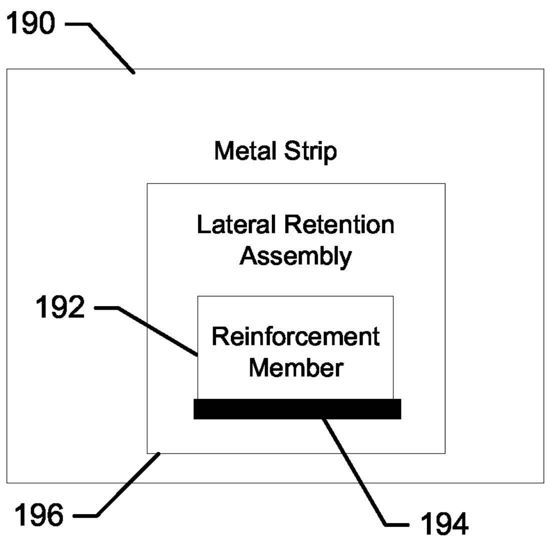
FIG. 4 illustrates a block diagram of a blade structure of an example embodiment.

This critical region for rollover can, however, be extended by modifying the structure of the blade 140 (or at least the portion extending rearward from the end hook 170 for a given distance). In this regard, by adding an anti-rollover treatment to a center or axis of symmetry of the concave portion of the blade 140 over the given distance, the amount of extension of the blade 140 that can be achieved before rollover occurs may be increased. FIG. 4 illustrates one example of how this treatment may be accomplished.

FIG. 4 is a block diagram of a blade structure of example embodiment. In this regard, metal strip 190 may be an elongate metallic strip that is ultimately formed into the blade 140 responsive to cupping of the metal strip 190. The metal strip 190 is provided with a reinforcement member 192 that extends along the center or axis of symmetry of the concave portion of the metal strip 190 after cupping. Thus, the reinforcement member 192 may extend along a longitudinal centerline of the concave side of the metal strip 190. The reinforcement member 192 may be affixed to the metal strip 190 at one end of the reinforcement member 192 at a fixed joint 194. Meanwhile, the reinforcement member 192 is bounded laterally by a lateral retention assembly 196 that enables the reinforcement member 192 to slide along the metal strip 190 at points other than at the fixed joint 194. In this regard, the lateral retention assembly 196 may extend (continuously or in increments) along lateral sides of the reinforcement member 192 to prevent the reinforcement member 192 from separating from the metal strip 190 or from moving laterally relative to the longitudinal centerline of the metal strip 190, while permitting movement longitudinally. The freedom to slide along the longitudinal direction is necessary since the reinforcement member 192 and the metal strip 190 will be wound up at different speeds when the metal strip 190 is retracted (e.g., into the housing 110).

In various example embodiments, the lateral retention assembly 196 may be embodied in various different ways. For example, repeated rivets or other such devices may be disposed at intervals along the lateral sides of the reinforcement member 192 to hold the reinforcement member 192 in position proximate to the metal strip 190. Alternatively, different mechanical interfaces may be defined to accomplish the same function. For example, the wings or lateral edges of the metal strip 190 could be folded inwardly to define a slot or C-channel inside with lateral edges of the reinforcement member 192 may be retained (but otherwise allowed to slide longitudinally). Additional metallic strips could be welded or adhered or joined via mechanical or chemical bonding method. to the metal strip 190 to define such slots or channels in other examples. In still other examples, the lateral retention assembly 196 may be defined by an overlay material that retains the reinforcement member 192 proximate to the metal strip 190. One example of such an overlay is shown the example of FIGS. 5A and 5B.

Figure 5A:
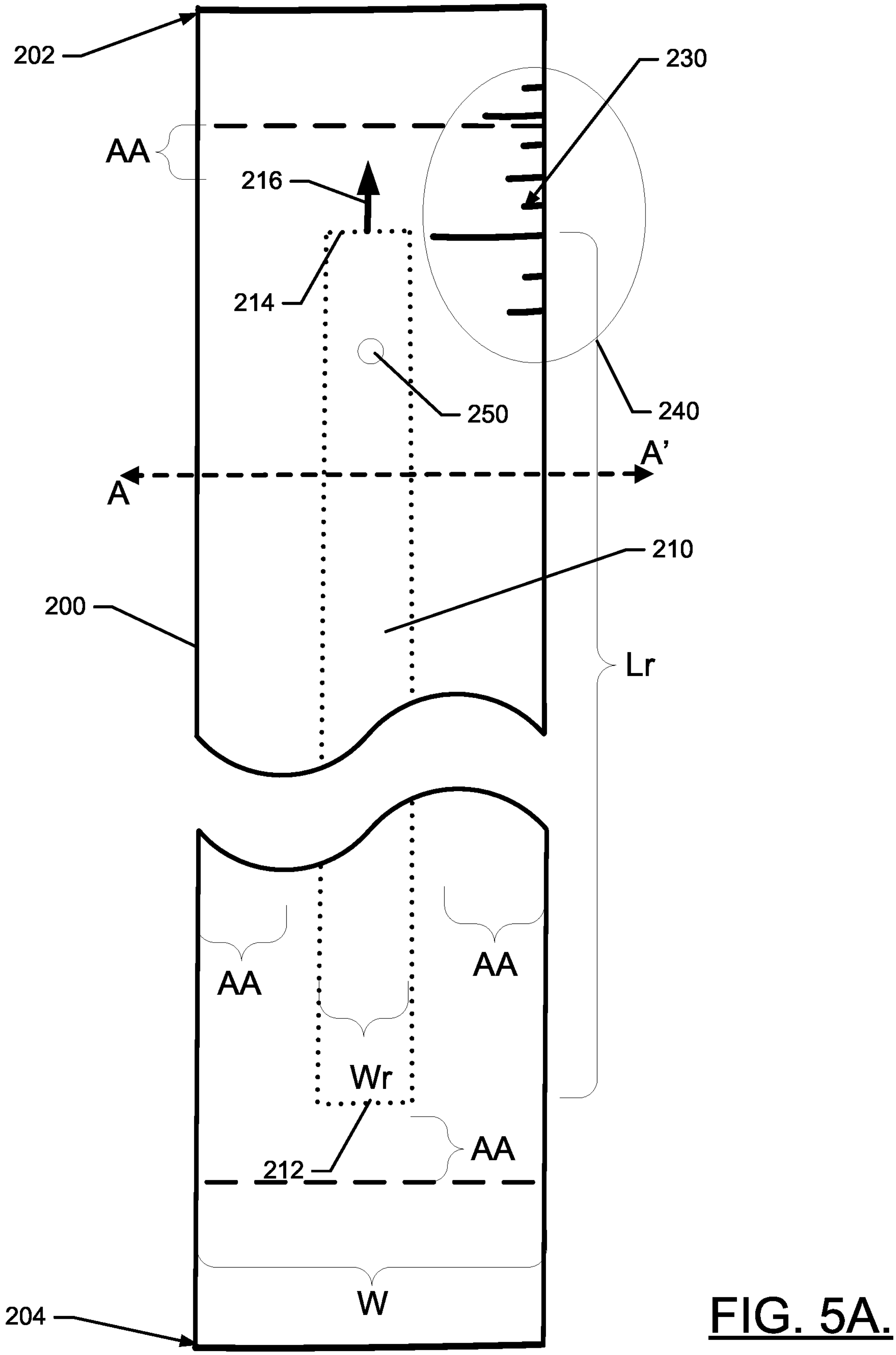
FIG. 5A illustrates a top view of an elongate metallic strip that may ultimately be formed into a blade according to an example embodiment.
Figure 5B:
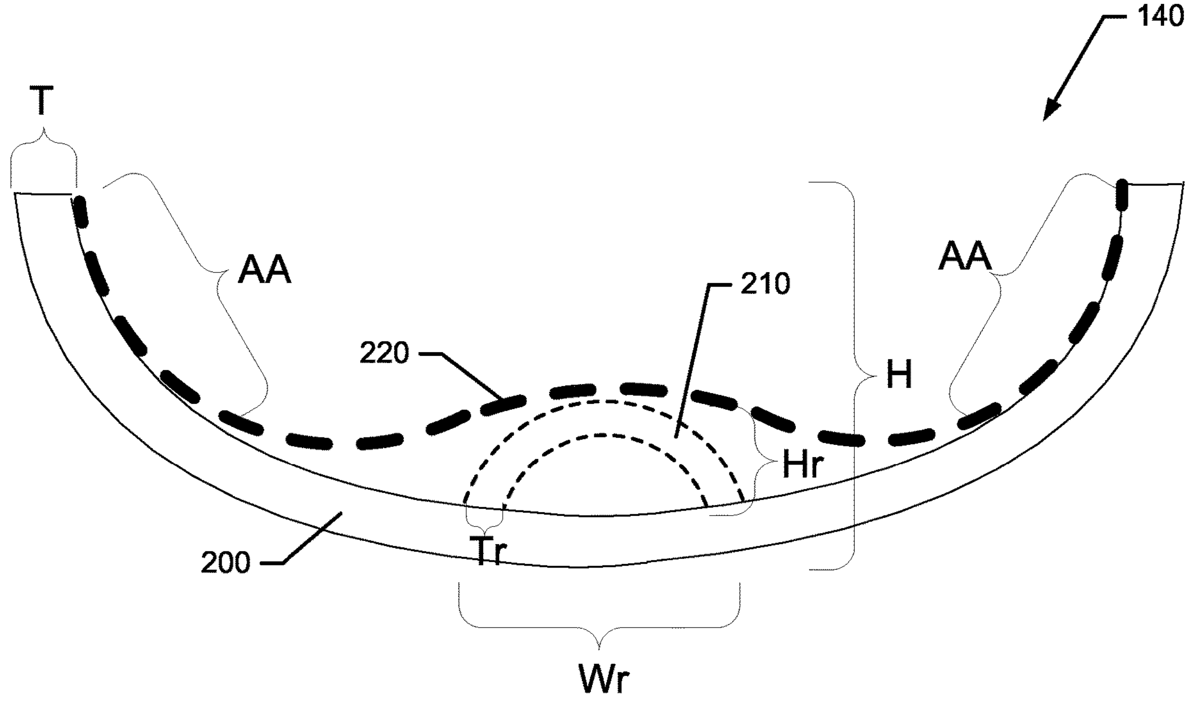
FIG. 5B illustrates a cross section view taken along line A-A' of FIG. 5A according to an example embodiment.

FIG. 5A illustrates a top view of an elongate metallic strip 200 that may ultimately be formed into the blade 140 (and therefore is an example of the metal strip 190 described above). Meanwhile, FIG. 5B illustrates a cross section view taken along line A-A' in FIG. 5A. In this regard, the metallic strip 200 may have a thickness (T), a width (W) and a height (H) that is substantially consistent over the entire length of the metallic strip 200 extending from a first end 202 to a second end 204 of the metallic strip 200. However, in some cases, portions of the metallic strip 200 may be cupped or flattened to different degrees to improve standout or provide other desired characteristics. In most cases, the flat width and thickness of the metallic strip 200 will, however, remain consistent. The width (W) may be an arc width, or the curved width of the metallic strip 200 from wing tip to wing tip after cupping has been performed on the metallic strip 200. The height (H) may be an arc height measured from the wing tips to the longitudinal centerline (or apex) of the metallic strip 200. Meanwhile, the length of the metallic strip 200 may be selected for a standard length of a tape measure device (e.g., 12 ft., 25 ft., 50 ft., etc.).

To apply the anti-rollover treatment of an example embodiment, a reinforcement strip 210 (e.g., an example of the reinforcement member 192 of FIG. 4) may be applied to the top of the metallic strip 200 along the longitudinal centerline of the metallic strip 200, and on the convex side thereof. In some cases, the reinforcement strip 210 may be applied over a selected length (Lr) of the metallic strip 200. The selected length (Lr) of the reinforcement strip 210 may have any desirable length up to and including nearly a full length of the metallic strip 200. However, the reinforcement strip 210 will typically be at least somewhat shorter than the full length of the metallic strip 200. In some embodiments, the selected length (Lr) may be between 36 inches to 144 inches in length. However, shorter or longer lengths are also possible.

As best seen in FIG. 5B, the reinforcement strip 210 may be curved opposite the curvature of the metallic strip 200 such that wing tips of the reinforcement strip 210 engage opposite sides of the longitudinal centerline of the top of the metallic strip 200. In other words, the concave faces of each of the metallic strip 200 and the reinforcement strip 210 may be directed to face toward each other so that the curvatures of each strip are in opposite directions. This curvature in the opposite direction to that of the metallic strip 200 provides a spring force that opposes the collapse that would otherwise occur during rollover. The reinforcement strip 210 may have a thickness (Tr), a width (Wr) and a height (Hr) that is substantially consistent over the entire length of the reinforcement strip 210. As noted above for the metallic strip 200, some portions of the reinforcement strip 210 may also be cupped or flattened to different degrees to improve characteristics thereof. In most cases, the flat width and thickness of the reinforcement strip 210 will, however, remain consistent. The width (Wr) may be an arc width that is between about 0.2 to 2 times the width (W) of the metallic strip 200. The height (Hr) may be an arc height that is between about 0.04 to about 0.75 times the height (H) of the metallic strip 200. The thickness (Tr) may be a thickness that is about 0.25 to 1.75 times the thickness (T) of the metallic strip 200.

In an example embodiment, the selected length (Lr) may extend longitudinally from a fixed joint 212 to a terminus 214. The terminus 214 may be spaced apart from, but otherwise closest to, the first end 202 of the metallic strip 200. When spaced apart from the first end 202, the terminus 214 may typically be no farther than 36 inches from the first end 202, but may be relatively close to the first end 202 in other examples (e.g., 1 or 2 inches). The first end 202 of the metallic strip 200 may be the end to which the end hook 170 is applied. Thus, it can be appreciated that the fixed joint 212 may be closest to the second end 204 of the metallic strip 200. In some cases, the fixed joint 212 may be located at the second end 204, but in other examples (as shown in FIG. 5A), the fixed joint 212 may be spaced apart from the second end 204.

In some embodiments, the fixed joint 212 may be formed by welding the metal of the metallic strip 200 to the metal of the reinforcement strip 210. However, the reinforcement strip 210 need not always be made of metal (e.g., spring steel, like the metallic strip 200). In this regard, for example, the reinforcement strip 210 could instead be made of plastic or another rigid polymeric material of which could contain embedded reinforcements such as glass, carbon fiber, etc. (e.g., polyamide aka nylon, polypropylene, Polyester, (PET/PBT), Polycarbonate (PC), Epoxy, etc.) that is able to exhibit a spring-like quality to oppose collapse of the metallic strip 200 that would otherwise cause rollover. The reinforcement strip 210 may also be made of materials that include a combination of a laminate of both metal and plastic. In other words, numerous different materials could be employed, but the material may be selected to have a high stiffness and flexibility. Accordingly, as an alternative to welding, the fixed joint 212 may be made via one or more rivets, adhesives, or other structures or materials that can bind the end of the reinforcement strip 210 at the fixed joint 212 to a top surface of the metallic strip 200. For example, the metallic strip 200 could have a slot formed therein, and a portion of the reinforcement strip 210 may be passed through the slot and bent to form the fixed joint 212. Other structural fixing means may also be employed.

Regardless of how the fixed joint 212 is formed, it should be appreciated that the opposing curvatures of the metallic strip 200 and the reinforcement strip 210 will result in different rates at which such strips will be coiled up responsive to retraction (e.g., of the blade 140 onto the reel assembly 120). As a result, during coiling, the terminus 214 of the reinforcement strip 210 will tend to move in the direction shown by arrow 216 in FIG. 5A. To accommodate these different rates, the lateral retention assembly 196 of FIG. 4 must enable the reinforcement strip 210 to slide along the metallic strip 200 relatively freely in the longitudinal direction, while preventing any (or much) lateral displacement of the reinforcement strip 210. In the depicted example, the lateral retention assembly 196 is therefore provided in the form of a polymer overlay 220.

The polymer overlay 220 may have a width that is substantially equal to the width (W) of the metallic strip 200. Thus, where coextensive with the metallic strip 200, the polymer overlay 220 may extend from wing tip to wing tip of the opposing lateral edges of the metallic strip 200. The polymer overlay 220 may be affixed to the wing tips of the metallic strip 200 over an adhered area (AA). An adhesive or other (e.g., mechanical) fixing means may be employed to affix the polymer overlay 220 to the metallic strip 200 on both lateral sides of the reinforcement strip 210. However, the polymer overlay 220 may (in some cases) not be affixed in any way to the reinforcement strip 210, and may not be affixed to portions of the metallic strip 200 that are proximate to the reinforcement strip 210 in order to avoid putting any pressure on the reinforcement strip 210. Meanwhile, in other alternative embodiments, the polymer overlay 220 and the adhered area (AA) may overlap the reinforcement strip 210 at the fixed joint 212, and may assist in forming the fixed joint 212. Thus, the adhered area (AA) may extend toward the reinforcement strip 210 to limit lateral movement of the reinforcement strip 210, but not limit longitudinal movement of the reinforcement strip 210 (except possibly at the fixed joint 212). Accordingly, the metallic strip 200 may have the reinforcement strip 210 applied thereto at a longitudinal center of the metallic strip 200 so as to be fixed at an end of the reinforcement strip 210 that is opposite the end hook 170, and unfixed at an end of the reinforcement strip 210 that is closest to the end hook 170.

The reinforcement strip 210 may typically extend continuously (i.e., where the reinforcement strip 210 is one unitary piece of material) from the fixed joint 212 to the terminus 214. As noted above, the amount of spacing provided from the first end 202 may be, for example, 0 to 36 inches in some cases. In some example embodiments, the reinforcement strip 210 (and the metallic strip 200) may be made of steel. However, other rigid metals or materials may also be employed in alternative embodiments. Although the thickness (Tr) of the reinforcement strip 210 can vary relative to the thickness (T) of the metallic strip 200, the same thickness for each may be employed in some cases.

Similarly, although the reinforcement strip 210 may have a range of widths (Wr) that may be equal to the width (W) of the metallic strip 200 in some cases, it may be desirable to select the width (Wr) to be less than about ½ the width (W) of the metallic strip 200 in some cases to ensure that any reference markings 230 (shown for example in detail window 240) may not be impacted by the reinforcement strip 210. The reference markings 230 may be printed on the polymer overlay 220, or on the metallic strip 210. If the reference markings 230 are printed on the metallic strip 210, the polymer overlay 220 may be transparent. However, the polymer overlay 220 need not be transparent (and could be opaque, and any desired color) if the reference markings 230 are disposed on the polymer overlay 220.

As shown in FIG. 5A, the polymer overlay 220 may extend beyond the terminus 214 to account for movement of the reinforcement strip 210 in the direction of arrow 216. However, due to the fact that the fixed joint 212 retains the reinforcement strip 210 both laterally and longitudinally, the polymer overlay 220 need not necessarily extend beyond the fixed joint 212. In some cases, the polymer overlay 220 may fully enclose the reinforcement strip 210 between the polymer overlay 220 and the metallic strip 200. In such cases, the longitudinal ends of the polymer overlay 220 may be sealed or adhered to the metallic strip 200. To avoid having an air pocket form proximate to the terminus 214, a vent hole 250 may be formed in either the polymer overlay 220 or the metallic strip 200 proximate the terminus 214. However, in some embodiments, the vent hole 250 may not be necessary based on the choice of material used for the polymer overlay 220. For example, air permeable polymeric materials, breathable films, woven textiles, organic fabrics, inorganic fabrics, etc., that permit air passage, may be used as overlays without the vent hole 250.

Figure 6A:
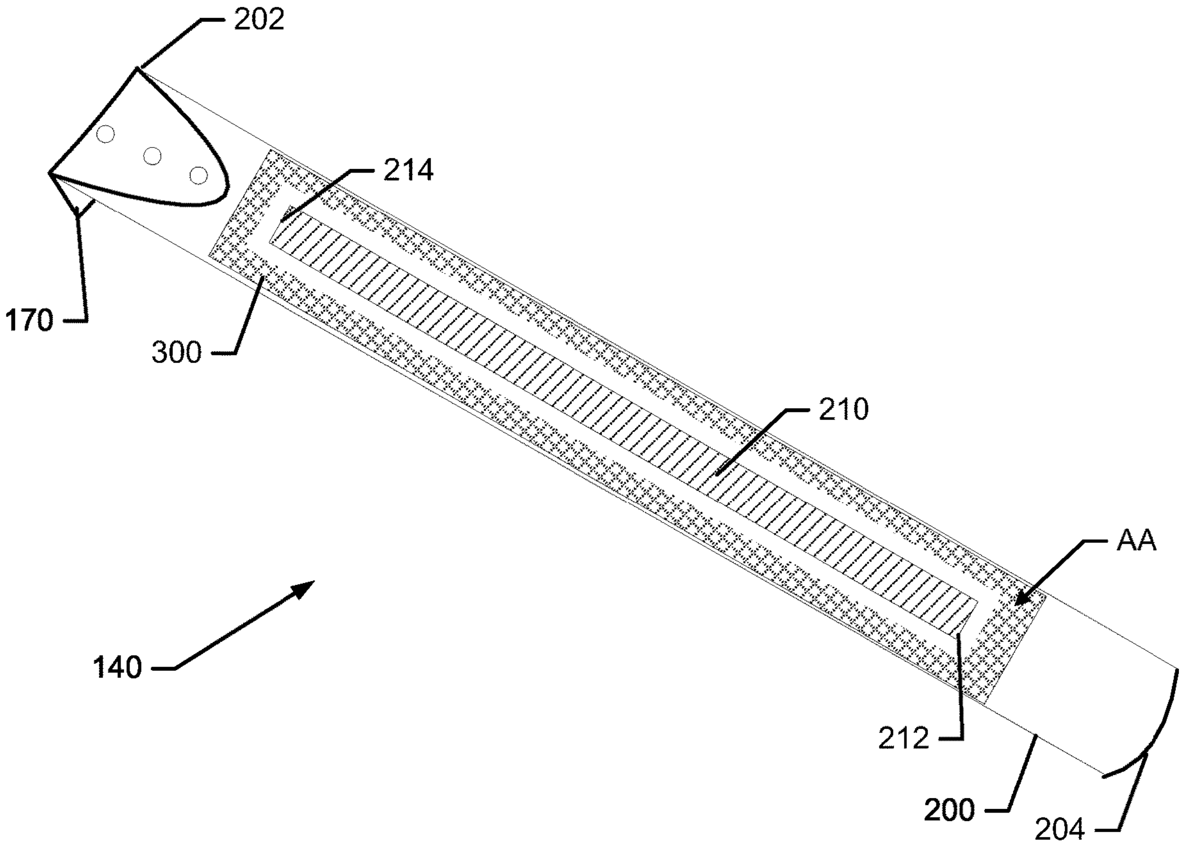
FIG. 6A illustrates a perspective view of the blade with a reinforcement strip and adhesive applied to a top portion of a metallic strip according to an example embodiment.

FIG. 6A shows a top perspective view of the blade 140 (with polymeric overlay not yet adhered thereto). In this regard, the blade 140 is shown to include the metallic strip 200 described above, with the end hook 170 attached to the first end 202 thereof. The reinforcement strip 210 is applied to the top of the metallic strip 200 (at an apex or longitudinal center thereof), and then an adhesive 300 is applied to an adhered area (AA) that is spaced apart from the terminus 214 and from the fixed joint 212 of the reinforcement strip 210, and from the lateral sides of the reinforcement strip 210. Meanwhile the adhesive 300 may be applied out to the lateral edges (or nearly to the lateral edges) of the metallic strip 200. The polymeric overlay may then be applied coextensive with the adhered area (AA) to encapsulate the reinforcement strip 210 therein. However, it should be appreciated that the polymer overlay 220 may be adhesive-backed in some cases, so that the adhesive 300 is applied simultaneously with the polymer overlay 220. In alternative embodiments, the polymer overlay (or a fabric sleeve) may be provided on both top and bottom portions of the metallic strip 200 to encase the entire blade 140 over at least the selected length (Lr). The top overlay will be secured to the top of the metallic strip 200 as described above, and the bottom overlay may be secured in any desirable way.

Figure 6B:
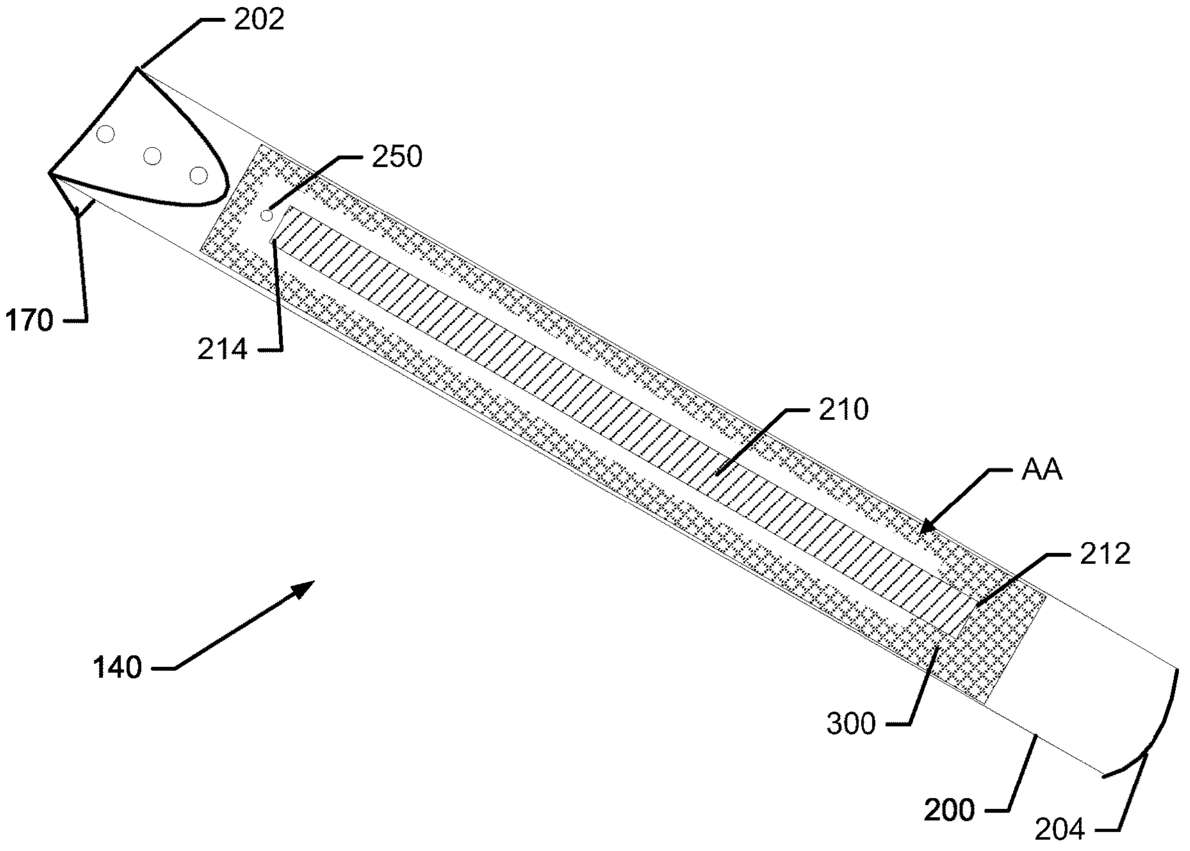
FIG. 6B illustrates a perspective view of the blade with the reinforcement strip and adhesive applied to the top portion of the metallic strip, where the adhesive overlaps with the fixed joint between the reinforcement strip and the metallic strip in accordance with an example embodiment.

FIG. 6B illustrates an alternative where the adhered area (AA) may overlap the fixed joint 212. Moreover, it should be appreciated that the adhesive 300 used to form the adhered area (AA) may also be used to adhere a portion of the reinforcement strip 210 to the metallic strip 200 thereby actually using the adhesive 300 to form the fixed joint 212. Thus, the adhesive 300 may be under and/or over the top of the reinforcement strip 210. In the example of FIG. 6B also, however, the adhered area (AA) remains spaced apart from the terminus 214 and lateral sides of the reinforcement strip 210 at areas separated from the fixed joint 212.

In an example embodiment, a width of the adhered area (AA) may be greater than 1/16th of an inch (i.e., 0.0626 inches). Thus, an acceptable range of widths of the adhered area (AA) may be from 0.0625 inches to $A_{max}$, where $A_{max}$=(Flat tape width−Flat reinforcement width)/2. The flat tape width is the width of the metallic strip 200 flattened out. The flat reinforcement width is the width of the reinforcement strip flattened out.

Figure 7:
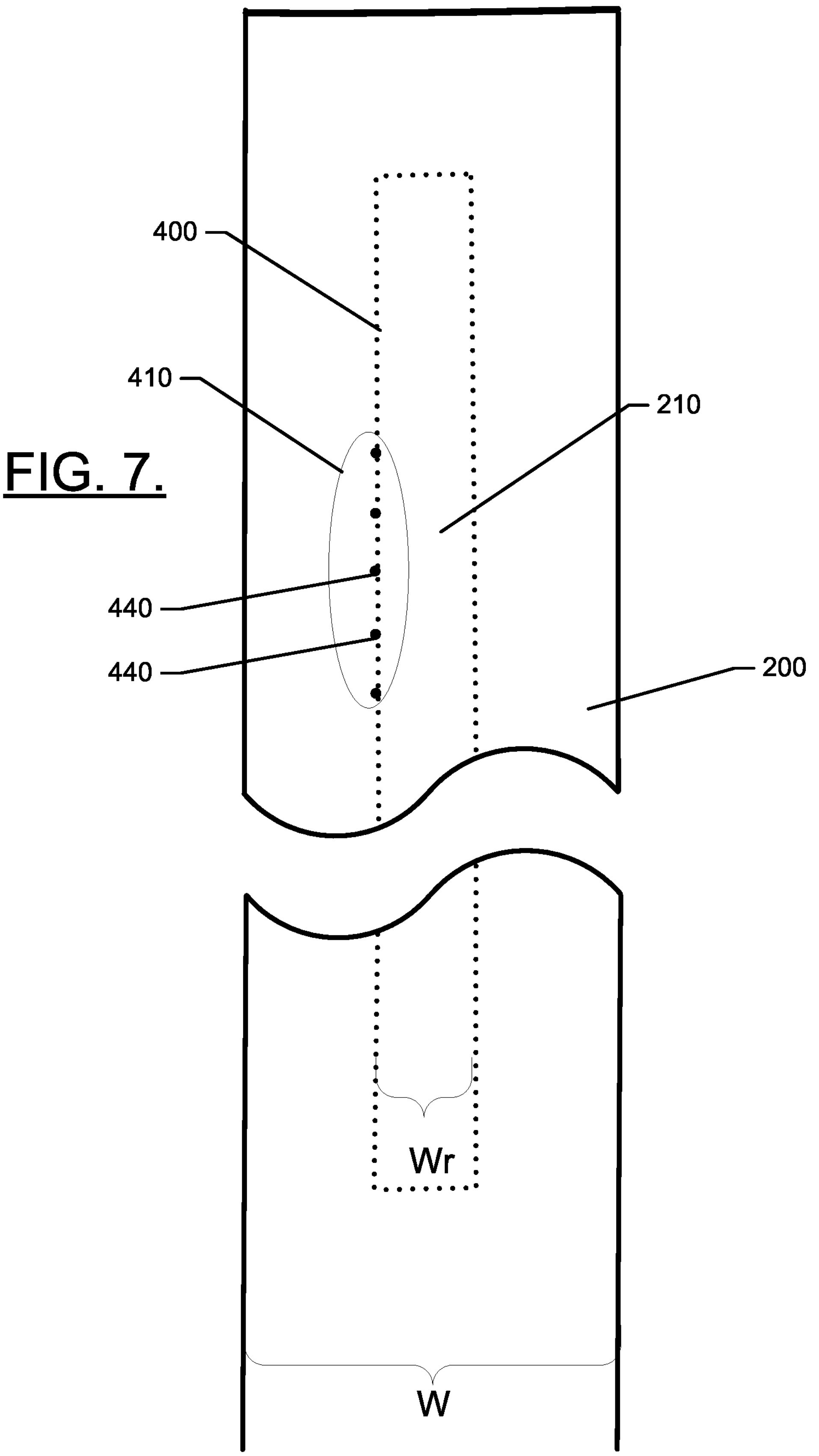
FIG. 7 illustrates a top view of the blade showing a seam with rivets used to provide the lateral retention assembly in accordance with an example embodiment.

As noted above, the lateral retention assembly could take other forms. FIG. 7 illustrates such an example. In this regard, FIG. 7 shows a seam 400 or lateral edge of the reinforcement strip 210. Detail window 410 illustrates the application of individual rivets 440 to discrete locations along the seam 400. The rivets 440 may be applied to spaced apart locations distributed along the seam 400. In some cases, the rivets 440 may be substantially equidistant from each other along the entire length of the seam 400, on both lateral sides of the reinforcement strip 210 in any desirable pattern. Thus, for example, the rivets 440 could be placed in a zigzag pattern, or any other suitable pattern that is deemed efficient while enabling longitudinal movement of the reinforcement strip 210 relative to the metallic strip 200, but preventing lateral movement of the same. The rivets 440 may pass through the metallic strip 200, and only overlap the seam 400 slightly to permit movement of the reinforcement strip 210 relative to the metallic strip 200 in the longitudinal direction, while preventing any such movement in the lateral direction.

Example embodiments have been tested to demonstrate superior performance relative to conventionally designed measuring tapes. In this regard, example embodiments may be extended in the orientation of FIG. 3B above to greater than 65 inches without rollover occurring (with an end hook installed). Meanwhile, as shown in FIG. 8, various sample products that were tested (with and without end hooks) are not capable of achieving anything better than 34 inches (with an end hook) or 44 inches (with no end hook). Of note, the data in FIG. 8 was obtained using a test rig that orients the tape measure device as shown in FIG. 3B and then withdraws the tape from the housing of the tape measure by a predetermined distance with a movable support rig, at which distance the blade is locked. The movable support rig supports, but does not pinch the blade. The movable support rig is then moved inward toward the housing until the amount of blade unsupported beyond the movable support rig is sufficient to cause rollover. The value at which rollover occurs was then recorded for each sample. As noted above, example embodiments tested in the same manner can achieve in excess of 65 inches of unsupported blade pay out before rollover.

In an example embodiment, a measuring tape device (or a blade for such device) may therefore be provided. The measuring tape device may include a housing having an aperture, a reel assembly enclosed within the housing, and a blade having a first end configured to extend from the housing through the aperture and a second end configured to be wound on the reel assembly. The blade may further include an end hook attached to the first end, a metallic strip of material extending between the first end and second end where the metallic strip is cupped to define a first concave face, a reinforcement strip cupped to define a second concave face, and a lateral retention assembly. The reinforcement strip may be applied to a longitudinal centerline of a selected portion of the metallic strip such that the first concave face is directed toward the second concave face. The lateral retention assembly may be operably coupled to the metallic strip to retain the reinforcement strip laterally while enabling the reinforcement strip to move relative to the metallic strip in a longitudinal direction.

In some embodiments, the features of the device described above may be augmented or modified, or additional features may be added. These augmentations, modifications and additions may be optional and may be provided in any combination. Thus, although some example modifications, augmentations and additions are listed below, it should be appreciated that any of the modifications, augmentations and additions could be implemented individually or in combination with one or more, or even all of the other modifications, augmentations and additions that are listed. As such, for example, in some cases the reinforcement strip may be affixed to the metallic strip at a fixed joint disposed at an end of the reinforcement strip that is opposite the end hook, and the reinforcement strip may not be affixed to the metallic strip at a terminus opposite the fixed joint (or along any lateral sides thereof). In an example embodiment, the terminus may be spaced apart from the first end by a distance of less than about 36 inches. In some cases, the fixed joint may be located at the second end, or alternatively spaced apart from the second end. In an example embodiment, the lateral retention assembly may include a polymeric overlay encapsulating the reinforcement strip to constrain lateral movement of the reinforcement strip (while allowing longitudinal movement). In an example embodiment, the polymeric overlay may be adhered to the metallic strip via an adhesion area that extends proximate to and spaced apart from lateral edges of the reinforcement strip and from the terminus. In some cases, a vent hole may be disposed in the metallic strip proximate the terminus within a pocket defined by the polymeric overlay, or alternatively the vent hole may be disposed in the polymeric overlay proximate the terminus. In an example embodiment, the lateral retention assembly may be attached to the metallic strip via an adhesive. In an example embodiment, an arc height of the reinforcement strip may be between about 0.04 and 0.75 times an arc height of the metallic strip. In some cases, an arc width of the reinforcement strip is between about 0.2 and 1.0 times an arc width of the metallic strip. In an example embodiment, a thickness of the reinforcement strip may be between about 0.25 and 1.75 times a thickness of the metallic strip.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

The invention claimed is:

1. A blade for a measuring tape device, the blade comprising:

a first end at which an end hook is configurable;

a second end configured to be operably coupled to a reel assembly of the measuring tape device;

a metallic strip of material extending between the first end and second end, the metallic strip being cupped to define a first concave face;

a reinforcement strip cupped to define a second concave face, the reinforcement strip being applied to a longitudinal centerline of a selected portion of the metallic strip such that the first concave face is directed toward the second concave face; and a lateral retention assembly operably coupled to the metallic strip to retain the reinforcement strip laterally while enabling the reinforcement strip to move relative to the metallic strip in a longitudinal direction, wherein the lateral retention assembly comprises a polymeric overlay encapsulating the reinforcement strip to constrain lateral movement of the reinforcement strip.

2. The blade of claim 1, wherein the reinforcement strip is affixed to the metallic strip at a fixed joint disposed at an end of the reinforcement strip that is opposite the end hook, and wherein the reinforcement strip is not affixed to the metallic strip at a terminus opposite the fixed joint.

3. The blade of claim 2, wherein the terminus is spaced apart from the first end by a distance of less than about 36 inches.

4. The blade of claim 3, wherein the fixed joint is located at the second end.

5. The blade of claim 3, wherein the fixed joint is spaced apart from the second end.

6. The blade of claim 2, wherein the polymeric overlay is adhered to the metallic strip via an adhesion area that extends proximate to and spaced apart from lateral edges of the reinforcement strip and from the terminus.

7. The blade of claim 2, wherein a vent hole is disposed in the metallic strip proximate the terminus within a pocket defined by the polymeric overlay.

8. The blade of claim 2, wherein a vent hole is disposed in the polymeric overlay proximate the terminus.

9. The blade of claim 1, wherein the lateral retention assembly is attached to the metallic strip via an adhesive.

10. The blade of claim 1, wherein an arc height of the reinforcement strip is between about 0.04 and 0.75 times an arc height of the metallic strip.

11. The blade of claim 1, wherein an arc width of the reinforcement strip is between about 0.2 and 1.0 times an arc width of the metallic strip.

12. The blade of claim 1, wherein a thickness of the reinforcement strip is between about 0.25 and 1.75 times a thickness of the metallic strip.

13. A measuring tape device comprising:

a housing having an aperture;

a reel assembly enclosed within the housing; and a blade formed from a metallic strip of material having a first end configured to extend from the housing through the aperture and a second end configured to be wound on the reel assembly, the metallic strip being cupped to define a first concave face, wherein the blade further comprises a reinforcement strip that is cupped to define a second concave face, the reinforcement strip being applied to a longitudinal centerline of a selected portion of the metallic strip such that the first concave face is directed toward the second concave face, wherein the blade further comprises a lateral retention assembly operably coupled to the metallic strip to retain the reinforcement strip laterally while enabling the reinforcement strip to move relative to the metallic strip in a longitudinal direction, and wherein the lateral retention assembly comprises a polymeric overlay encapsulating the reinforcement strip to constrain lateral movement of the reinforcement strip.

14. The device of claim 13, wherein the reinforcement strip is affixed to the metallic strip at a fixed joint disposed at an end of the reinforcement strip that is opposite the end hook, and wherein the reinforcement strip is not affixed to the metallic strip at a terminus opposite the fixed joint.

15. The device of claim 14, wherein the terminus is spaced apart from the first end by a distance of less than about 24 inches.

16. The device of claim 14, wherein the polymeric overlay is adhered to the metallic strip via an adhesion area that extends proximate to and spaced apart from lateral edges of the reinforcement strip and from the terminus.

17. The device of claim 14, wherein a vent hole is disposed in the metallic strip proximate the terminus within a pocket defined by the polymeric overlay, or wherein the vent hole is disposed in the polymeric overlay proximate the terminus.

18. The device of claim 13, wherein an arc height of the reinforcement strip is between about 0.04 and 0.75 times an arc height of the metallic strip, wherein an arc width of the reinforcement strip is between about 0.2 and 1.0 times an arc width of the metallic strip, and wherein a thickness of the reinforcement strip is between about 0.25 and 1.75 times a thickness of the metallic strip.

* * * * *